United States Patent
Magee

(10) Patent No.: US 7,088,791 B2
(45) Date of Patent: Aug. 8, 2006

(54) SYSTEMS AND METHODS FOR IMPROVING FFT SIGNAL-TO-NOISE RATIO BY IDENTIFYING STAGE WITHOUT BIT GROWTH

(75) Inventor: David Patrick Magee, Plano, TX (US)

(73) Assignee: Texas Instruments Incorporated, Dallas, TX (US)

(*) Notice: Subject to any disclaimer, the term of this patent is extended or adjusted under 35 U.S.C. 154(b) by 886 days.

(21) Appl. No.: 10/082,826

(22) Filed: Oct. 19, 2001

(65) Prior Publication Data

US 2003/0076904 A1   Apr. 24, 2003

(51) Int. Cl.
*H04L 27/06* (2006.01)

(52) U.S. Cl. .......................... 375/340; 708/404

(58) Field of Classification Search ............ 375/260, 375/267, 285, 222, 340, 346, 349; 370/208, 370/210, 525, 526; 455/132, 137, 296; 708/404, 708/400, 403, 405, 408, 409

See application file for complete search history.

(56) References Cited

U.S. PATENT DOCUMENTS

| | | | |
|---|---|---|---|
| 3,800,130 A | 3/1974 | Martinson et al. | 235/156 |
| 4,872,132 A | 10/1989 | Retter | |
| 5,091,875 A | 2/1992 | Wong et al. | 364/726 |
| 5,481,488 A * | 1/1996 | Luo et al. | 708/404 |
| 5,717,620 A | 2/1998 | Williams | 364/726 |
| 6,055,268 A | 4/2000 | Chen et al. | |
| 6,098,088 A | 8/2000 | He et al. | 708/406 |
| 6,101,230 A * | 8/2000 | Chun et al. | 375/355 |
| 6,230,176 B1 | 5/2001 | Mizutani | 708/404 |
| 6,320,902 B1 * | 11/2001 | Nafie et al. | 375/228 |
| 6,411,978 B1 * | 6/2002 | Naveh et al. | 708/404 |
| 2003/0058787 A1 * | 3/2003 | Vandenameele-Lepla | 370/206 |

FOREIGN PATENT DOCUMENTS

| | | |
|---|---|---|
| WO | WO 00/07114 A | 2/2000 |
| WO | WO 00/73872 A | 12/2000 |

OTHER PUBLICATIONS

Yao-Ting Cheng, "Autoscaling Radix-4 FFT for TMS320C6000", Texas Instruments Application Report: SPRA654, Mar. 2000, p. 1-12.

Charles Wu, "Implementing the Radix-4 Decimation in Frequency (DIF) Fast Fourier Transform (FFT) Algorithm Using A TMS320C80 DSP", Texas Instruments Application Report: SPRA152, Jan. 1998, p. 1-36.

K. Kassapoglou, et al.; Computer Aided Implementation of Complex Algorithms on DSPs Using Automatic Scaling, Proc: ICASSP '87, 1987 Int'l Conf. on Acoustics, Speech and Signal Proc., IEEE, NY, NY, Apr. 6-9, 1987, vol. pp. 1027-1030.

* cited by examiner

*Primary Examiner*—Khanh Tran
(74) *Attorney, Agent, or Firm*—Abdul Zindani; W. James Brady, III; Frederick J. Telecky, Jr.

(57) ABSTRACT

Systems and methods are provided for performing signal processing on communication data utilizing scale reduced Fast Fourier Transform computations. The present invention provides scaling in a Fast Fourier Transform computation at stages where it is determined that bit growth is present and omits scaling at stages where it is determined that bit growth is absent. The determination is based on the characteristics of the input signal. The determination can be made off-line by modeling and/or simulation or in real-time by analyzing the input signal to determine stages at which bit growth is present and/or absent and setting the stage scaling accordingly.

26 Claims, 4 Drawing Sheets

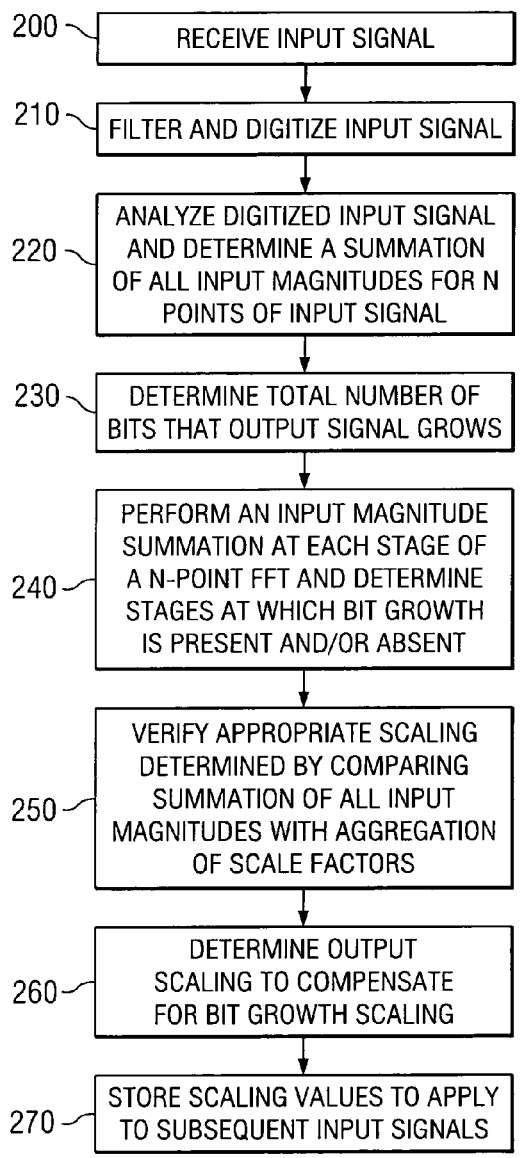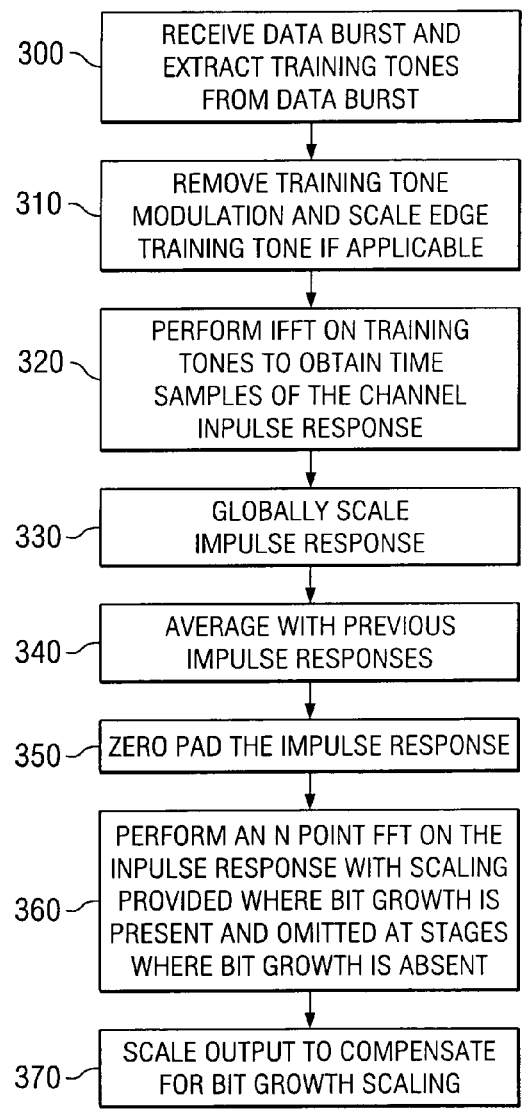

SYSTEMS AND METHODS FOR IMPROVING FFT SIGNAL-TO-NOISE RATIO BY IDENTIFYING STAGE WITHOUT BIT GROWTH

TECHNICAL FIELD

The present invention generally relates to signal processing and in particular to Fast Fourier Transform computations during the signal processing portion of a communication system.

BACKGROUND OF INVENTION

In most real time communication systems, digital signal processing algorithms are implemented using finite precision arithmetic. Data is often mapped from the time domain to the frequency domain using a Fast Fourier Transform (FFT). The FFT is a generic name for a class of computationally efficient computations that implement the Discrete Fourier Transform (DFT) and are widely utilized in digital signal processing. The FFT computation or operation can occur several times during a signal processing portion of a communication system. In signal processing, input signals are a sample of data points that represent amplitude and phase information, which are then reduced to complex numbers that are processed to extract weighted impulse function values. The FFT processing is performed by combinations of complex multiplications and complex additions. Each time FFT computations are performed bit growth can occur, which can compromise signal fidelity if not properly addressed with corrective measures (e.g., scaling).

Many real time communication systems utilize fixed-point digital signal processors (DSPs) to perform the FFT computations. The fixed-point DSP is highly programmable and cost efficient. However, a drawback is that the fixed-point DSP has limited dynamic range, which can be worsened by summation overflow problems that occur in FFT computations. It is common to break a FFT computation into a series of stages when implementing a FFT in a fixed-point processor such as a DSP. The simplest stage is commonly referred to as a Radix-2 stage. A FFT operation can be expressed in terms of only Radix-2 stages by taking advantage of the twiddle factor periodicity. The FFT is simply divided into two smaller FFTs, each of which is then divided into two smaller FFTs. This process is repeated until each FFT operates on only two data values. This simplified FFT can be graphically represented with a Radix-2 butterflies. A FFT consisting of only Radix-2 butterflies contains $Log_2(N)$ stages and each stage contains N/2 butterflies, with N being the number of input data values for the FFT operation.

Each Radix-2 butterfly contains two nodes for complex addition and one node for a twiddle factor multiplication. Since each real addition can potentially result in one bit of growth, the input data is scaled so that the result from the addition does not exceed the permissible number of bits. For example, if 16 bits are used to represent data, then the data must first be scaled by ½ so that the result can be represented by a 16-bit value. For each additional Radix-2 stage, an additional scale factor usually is required. In general, a scale factor for $1/Log_2(N)$ is created for a N-point FFT to account for the potential bit growth in all of the associated stages.

However, the employment of FFTs and IFFTs on signals is computationally expensive. Furthermore, many DSPs are not equipped to handle FFT computations in a timely manner to accommodate for other computations being performed on data. In some circumstances, parallel processing has been employed to handle the computations, but generally requires additional system costs and/or system real estate. Therefore, any reduction in computations of a FFT is desirable.

SUMMARY OF INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides for systems and methods for performing signal processing on communication data utilizing scale reduced FFT computations. The scale reduced FFT computations can be employed in digital signal processing of a received signal or during processing stages associated with encoding data into a modulated transmission signal. A determination can be made at which stages that bit growth does not occur or is absent based on the characteristics of the time domain input signal received at the FFT. For example, if the input signal to the FFT has a finite impulse response with terms that are substantially zero (e.g., zero or very near zero), many of the FFT stages will not experience bit growth. Therefore, scaling at these stages can be omitted. The determination can be made off-line, for example, by employing modeling and simulation on the input signal, prior to implementation of the FFT into a communication device. Alternatively, the input signal can be analyzed during operation of the communication device such that analysis can be performed in real-time and the values stored for scaling of subsequent input signals.

In one aspect of the invention, a scale reduced FFT is utilized in a receiver to transform a time domain input signal into a frequency domain signal. The input signal can conform to a multicarrier modulation format (e.g., OFDM) such that frequencies or tones are made available by employing a N-point FFT on the input signal. The scale reduced FFT can be provided via hardware components and/or software components, for example, programmed into a digital signal processor. The scaled reduced FFT can be employed during preprocessing of the input signal for extracting data encoded in the data signals. The scaled reduced FFT can also be employed in a channel estimation component or process to provide a channel estimate.

The following description and the annexed drawings set forth certain illustrative aspects of the invention. These aspects are indicative, however, of but a few of the various ways in which the principles of the invention may be employed. Other advantages and novel features of the invention will become apparent from the following detailed description of the invention when considered in conjunction with the drawings.

BRIEF DESCRIPTION OF THE DRAWINGS

FIG. 10 illustrates a flow diagram of a methodology for performing a scale reduced FFT on a received data signal in accordance with one aspect of the present invention.

FIG. 11 illustrates a flow diagram of a methodology for performing a channel estimation procedure in accordance with one aspect of the present invention.

DETAILED DESCRIPTION OF INVENTION

The present invention provides systems and methods for performing signal processing on received data utilizing scale reduced FFT computations. The scale reduced FFT computations allow for employment of signal processing devices of reduced complexities to be utilized in the decoding process of transmission signals. The present invention reduces scaling in a FFT computation by identifying stages where it is determined that bit growth is absent. The determination is based on the characteristics or format of the input signal to the FFT. For example, if the input signal to the FFT has a finite impulse response with terms that are substantially zero (e.g., zero or very near zero), many of the FFT stages will not experience bit growth. Therefore, scaling at these stages can be omitted. The determination can be made off-line by modeling and/or simulation or in real-time by analyzing the input signal to determine stages at which bit growth is present and/or absent and setting the stage scaling accordingly.

Figure 1:
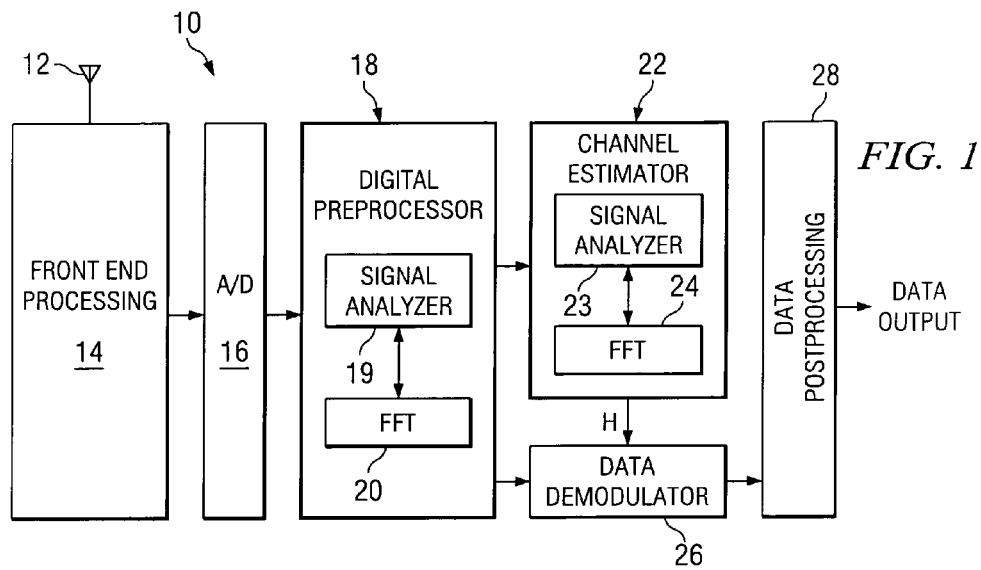
FIG. 1 illustrates a functional block diagram of a wireless receiver employing scale reduced FFTs in accordance with one aspect of the present invention.

FIG. 1 illustrates a schematic block diagram of a wireless receiver system 10 employing one or more scale reduced FFT computations in accordance with one aspect of the present invention. A data signal or burst is received by an antenna 12, which captures the data signal and transmits the data signal to a front end processing component 14. The front end processing component 14 amplifies the data signal, converts the data signal to an intermediate frequency (IF) and filters the data signal to eliminate signals that are outside of the desired frequency band. It is to be appreciated that many variations in receiver front end processing exist. For example, some receiver front end processing includes utilizing multiple IF frequencies and successive frequency conversions. Additionally, some receivers provide direct radio frequency (RF) sampling without IF stages. The front end processing component 14 feeds one or more analog-to-digital (A/D) converters 16 that sample the data signal and provide a digitized signal output. The front end processing component 14 can provide automatic gain control (AGC), as is conventional, to maintain the signal strength relative to the one or more A/D converters 16.

The digitized signal output of the one or more A/D converters 16 is then provided to a digital preprocessor 18. The digital preprocessor 18 provides additional filtering of the digitized signals and reduces or decimates the sample of the digitized signal. The digital preprocessor 18 then performs a FFT on the digitized signal. The FFT on the digitized signal is performed by a FFT component 20. The FFT component 20 converts the signal from the time domain to the frequency domain so that the frequencies or tones carrying the data can be provided. The FFT computations by the FFT component 20 include reduced scaling in accordance with one aspect of the invention based on the characteristics (e.g., amplitude response with terms that are zero or substantially zero) of the input signal.

For example, the digital preprocessor 18 can perform an analysis on the input signal using a signal analyzer 19. The signal analyzer 19 can determine at what stages of the FFT where bit growth is present and/or absent. For example, the signal analyzer 19 can determine a first summation of all input magnitudes for N points of the input signal to determine the total number of bits that the output signal grows. The signal analyzer 19 then performs an input magnitude summation at each stage of a N-point FFT to determine stages at which bit growth is present and/or absent. The N-point FFT includes performing a summation of the N points at a first stage and determining if bit growth is present. Multiplications can be omitted to reduce the number of computations. If bit growth is present the results of the summation of the N points is scaled by a scale factor, so that summation overflow does not occur. The summation and bit growth determination is repeated at subsequent stages. The scale factors can then be aggregated and compared to the input magnitude summation to verify that the appropriate scaling was determined.

Scaling is provided at stages where bit growth is present and omitted at stages where bit growth is absent to provide a scale reduced FFT computation. The appropriate scaling can then be set for subsequent input signals. If the input signal to the FFT has an impulse response with a generally consistent format, the scale reduced FFT can be determined by simulation and/or modeling and fixed prior to normal operation of the receiver 10. For example, if the input signal to the FFT has a finite impulse response with terms that are substantially zero (e.g., zero or very near zero), many of the FFT stages will not experience bit growth. Therefore, scaling at these stages can be omitted. The exact implementation of the digital preprocessor 18 can vary depending on the particular receiver architecture being employed to provide the frequencies or tones carrying the data. The frequencies and tones can then be demodulated and/or decoded.

In some cases the demodulation of the tones requires information relating to the wireless channel magnitude and phase at each tone. A channel can be defined as a wireless path of the transmission signal and a channel estimate defined as the effects of the channel on the magnitude and phase of the data signal. A channel estimator component 22 is provided to determine the amount of phase rotation and magnitude adjustment (hereinafter referred to as "the channel estimate") applied to training tones transmitted to the receiver.

Many wireless systems and some wired systems employ a channel estimation procedure to determine the effects the transmission environment has on the transmitted data signals. The channel estimation procedure utilizes training signals of known magnitude and phase to compensate for signal losses due to the transmission environment. The training signals can be transmitted prior to transmission of the data signals or interspersed in the data signals. The training signals can be analyzed to determine the effects of the environment on the training signals and this information utilized to adjust the data signals appropriately. For some multicarrier based systems, the training tones are embedded in a data signal and interspersed within tones carrying data. The known channel response at the training tones is then interpolated in the frequency domain to determine the channel response at the data tones.

In accordance with one aspect of the invention, the channel estimator 22 processes the training tones to determine the channel estimate employing a scale reduced FFT component 24. The scale reduced FFT component 24 performs FFT computations with scaling provided at FFT stages where bit growth is present and scaling omitted at FFT stages where bit growth is absent. The scale reduced FFT calculations increase the throughput of the receiving system 10 by reducing the number of instruction cycles required to process the incoming digitized signal. The channel estimator 22 extracts the training tones from the number of tones (N) in the data signal or data burst and performs several signal processing steps on the training tones. An Inverse Fast Fourier Transform (IFFT) is performed on the training tones to obtain time samples of the channel impulse response. The channel impulse response is then averaged and fed into the scale reduced FFT component 24.

The channel impulse response can be analyzed similarly to the FFT operation of the digital preprocessor 18 by performing an analysis on the input signal utilizing a signal analyzer component 23. The signal analyzer component 23 can determine at what stages of the FFT where bit growth is present and/or absent. For example, the signal analyzer 23 can determine a first summation of all input magnitudes for N points of the input signal to determine the total number of bits that the output signal grows. The signal analyzer 23 then performs an input magnitude summation at each stage of a N-point FFT to determine stages at which bit growth is present and/or absent. The N-point FFT includes performing a summation of the N points at a first stage and determining if bit growth is present. If bit growth is present the results of the summation of the N points is scaled by a scale factor, so that summation overflow does not occur. The summation and bit growth determination is repeated at subsequent stages. Multiplications can be omitted to reduce computations by the signal analyzer 23. The scale factors can then be aggregated and compared to the first summation to verify that the appropriate scaling was determined. If the input signal to the FFT has a finite impulse response with terms that are substantially zero (e.g., zero or very near zero), many of the FFT stages will not experience bit growth. Therefore, scaling at these stages can be omitted.

A channel estimate (H) is then provided to the data demodulator 26 for demodulation of the digital data signal, and other functions such as beamforming and slicing for bit constellation mapping. The demodulated data signal is then transmitted to a data postprocessing component 28 for further signal processing. The data postprocessing component 28 performs error correction utilizing the information provided by the data demodulator 26 in addition to providing block or packet formatting. The data postprocessing component 28 then outputs the data for decoding.

The scale reduced FFT in accordance with an aspect of the invention can be employed on a variety of different communication methods and devices utilizing FFT analysis in digital signal processing. One particular communication method is referred to as multicarrier modulation. One special case of multicarrier modulation is referred to as Orthogonal Frequency Division Multiplexing (OFDM). In general, OFDM is a block-oriented modulation scheme that maps a number of data symbols into a number of orthogonal carriers separated by a distance 1/T where T is a block period. OFDM is a technique by which data is transmitted at a high rate by modulating several low bit rate carriers in parallel rather than one single high bit rate carrier. OFDM is particularly useful in the context of Digital Audio Broadcasting, High Definition Television (HDTV) and also for Asymmetric Digital Subscriber Lines (ADSL). OFDM can also be useful in satellite television systems, cable television, video on demand, interactive services, mobile communication devices, voice services and Internet services.

An important advantage of the OFDM is that intersymbol interference due to signal dispersion in the transmission channel can be reduced by inserting a guard time interval, known as the cyclic prefix, between the transmission of subsequent bursts. This removes intersymbol interference alleviating the need for equalizers as required by single carriers. The guard time allows delayed copies (e.g., reflections) of the main symbol to die out before the succeeding symbol is received by the receiver. Due to this property, OFDM has gained popularity in high data rate systems including wireless broadband applications.

In transmission of a data signal, an OFDM modulator converts a serial data stream into a block of N complex carriers. The sum of the individual carriers, of which amplitude and phase can be modulated, correspond to a time domain waveform that can be generated using an Inverse Discrete Fourier Transform (IDFT). The Inverse Fast Fourier Transform (IFFT) is a well known efficient implementation of the IDFT that performs a N-point IDFT transform. The guard time is inserted into the output of the IDFT and filled in with a copy of the symbol (called a cyclic prefix) to preserve the orthogonality between carriers. At the receiver end, a data signal or data burst is received in the time domain. The data signal is converted back into the frequency domain employing a FFT for extraction of the symbols from the data burst. The frequency domain signal is comprised of a plurality of data tones, training tones and zero tones. The training tones are transmitted at known magnitude and phase and employed in determining the channel estimate for use in compensating the data tones due to the effects of the channel on the tones.

It is to be appreciated that although the example of FIG. 1 was provided with respect to performing scale reduced FFTs on a received signal, the present invention is applicable to other parts of a communication device. For example, the scale reduced FFT can be implemented into processing stages associated with encoding data into a modulated transmission signal. The present invention is also applicable to other signal processing portions of a communication device that utilizes FFT computations on digitized data.

Figure 2:
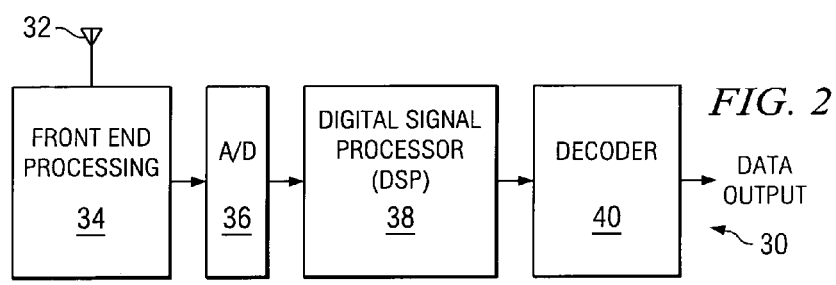
FIG. 2 illustrates a functional block diagram of a wireless modem employing scale reduced FFTs in accordance with one aspect of the present invention.

FIG. 2 illustrates a schematic block diagram of a wireless modem system 30 employing a digital signal processor (DSP) 38 utilizing scale reduced FFT algorithms in accordance with one aspect of the present invention. The present invention is useful in maximizing the signal-to-noise ratio (SNR) in a FFT for broadband modem applications due to the nature of the time domain channel response. For broadband communication systems, the input can be quantified through models and simulation. Since there are a limited number of paths that the communication signal traverses as it goes from the transmitter to the receiver, many of the time domain channel response values are zero or very near zero. Since many of the amplitudes are zero, the scaling in the FFT can be reduced to give better SNR performance over a FFT designed without knowing the characteristics of this type of channel response.

Referring again to FIG. 2, a data signal or burst is received by an antenna 32, which captures the data signal and delivers the data signal to a front end processing component 34. The front end processing component 34 amplifies the data signal, converts the data signal to an intermediate frequency (IF) and filters the data signal to eliminate signals that are outside of the desired frequency band. The front end processing component 34 feeds one or more analog-to-digital (A/D) converters 36 that sample the data signal and provide a digitized signal output to a digital signal processor (DSP) 38. The DSP 38 performs signal processing steps on the received data to facilitate error reductions and to compensate for channel interference, noise and multipath effects on the transmitted signal. The DSP 38 then provides data to the decoder 40, which performs error correction and data decoding. The decoder 40 then transmits the data to a central controller (not shown).

The DSP 38 contains algorithms for performing signal processing on the digitized data signal. Some of the DSP algorithms include channel estimation, channel correction, timing slip correction, noise estimation and correction, weighted channel estimates, beamforming, slicing, deinterleaving and constellation bit mapping. Some of these algorithms employ FFT computations. For example, the DSP 38 performs a FFT on the digitized signal to convert the signal from the time domain to the frequency domain so that the frequencies or tones carrying the data can be provided. The DSP also performs a FFT on a channel impulse response to determine a channel estimate based on training tones embedded in the data signals.

The FFT computations can include reduced scaling based on the characteristics (e.g., amplitude response with terms that are zero) of the input signal to the FFT. The DSP 38 can include an algorithm for performing a signal analysis on the input signal. The signal analysis determines the FFT stages where bit growth does and does not occur. Scaling at stages where bit growth does not occur can be omitted to provide a scale reduced FFT computation. Furthermore, if the impulse response has a generally consistent format, the scale reduced FFT can be determined and fixed prior to normal operation of the modem 30. For example, if the input signal to the FFT has an amplitude response with zero values, many of the FFT stages will not experience bit growth. Therefore, scaling at these stages can be omitted.

The present invention is useful in applications utilizing fixed receiver systems. In fixed receiver systems, multipath dispersions occur when signals propagate along different or reflected paths through a transmission medium to a receiving destination. The resulting time domain channel response will have a nonzero value for each propagation path. Additionally, the channel only changes at a rate of about 1–2 hertz or about every second so that the channel remains relatively stable during normal operation. The present invention is also useful in wireless communications with network infrastructures, such as the Internet.

The following description illustrates a signal analysis of an input signal to determine FFT stages for which bit growth is present and/or absent. The discrete Fourier transform, commonly called the DFT, of a finite-duration sequence is known as the Fast Fourier Transform or more commonly referred to as just the FFT. The mathematical representation of the FFT takes the form:

$$X[k] = \sum_{n=0}^{N-1} x[n] e^{-j\frac{2\pi nk}{N}} \quad \text{for } 0 \leq k \leq N-1 \quad (1)$$

where $X[k]$ is the FFT value for index k, $x[n]$ is the $n^{th}$ value in the finite-duration sequence x and N is the length of the finite-duration sequence.

To understand how bit growth occurs during the computation of a FFT, consider the magnitude of the FFT given by:

$$|X[k]| = \left| \sum_{n=0}^{N-1} x[n] e^{-j\frac{2\pi nk}{N}} \right| \quad \text{for } 0 \leq k \leq N-1. \quad (2)$$

Since the absolute value of a sum is less than or equal to the sum of the absolute values, Equation (2) can be written as:

$$|X[k]| \leq \sum_{n=0}^{N-1} \left| x[n] e^{-j\frac{2\pi nk}{N}} \right| \quad \text{for } 0 \leq k \leq N-1, \quad (3)$$

which can be further simplified to:

$$|X[k]| \leq \sum_{n=0}^{N-1} |x[n]| \left| e^{-j\frac{2\pi nk}{N}} \right| \quad \text{for } 0 \leq k \leq N-1. \quad (4)$$

Since the magnitude of the exponential is always equal to one, i.e. $|e^{-j 2\pi nk/N}|=1$, Equation (4) can be written as $$|X[k]| \leq \sum_{n=0}^{N-1} |x[n]| \quad \text{for } 0 \leq k \leq N-1 \quad (5)$$

Since the maximum value of the sequence is bounded, it can be shown that:

$$|x[n]| < 2^Q \quad (6)$$

where Q denotes an integer power of 2, i.e. $Q=\lfloor \log_2(x_{max}) \rfloor +1$. It is worth noting that Q+1 bits are required to represent the corresponding signed number. When the finite sum in Equation (5) is considered, the FFT upper bound becomes:

$$|X[k]| \leq \sum_{n=0}^{N-1} |x[n]| < 2^{Q+N-1} \quad (7)$$

which suggests that Q+N bits are required to represent any value in a N-point FFT.

For communication systems, not all of the Q+N bits are required to represent the FFT magnitudes because there are a limited number of paths that the signal traverses as it goes from the transmitter to the receiver. As a result, many of the channel response values are zero or very near zero. With this information, the upper bound for the FFT of a communication channel response can be written as $$|X[k]| \le \sum_{n=0}^{N-1} |x[n]| < 2^{Q+P-1} \text{ where } P \le N \quad (8)$$

where P is the additional number of bits required for the summation. This relationship suggests that only Q+P bits are required. More importantly, there will be at most P−1 bits of growth in a given FFT. The value of P can be determined by analyzing the channel models for a particular communication system. Once P has been determined, the number of shifts required in the FFT will be known. The location of the shifts within the FFT is determined by evaluating the channel responses through each stage and determining where bit growth occurs.

Figure 3:
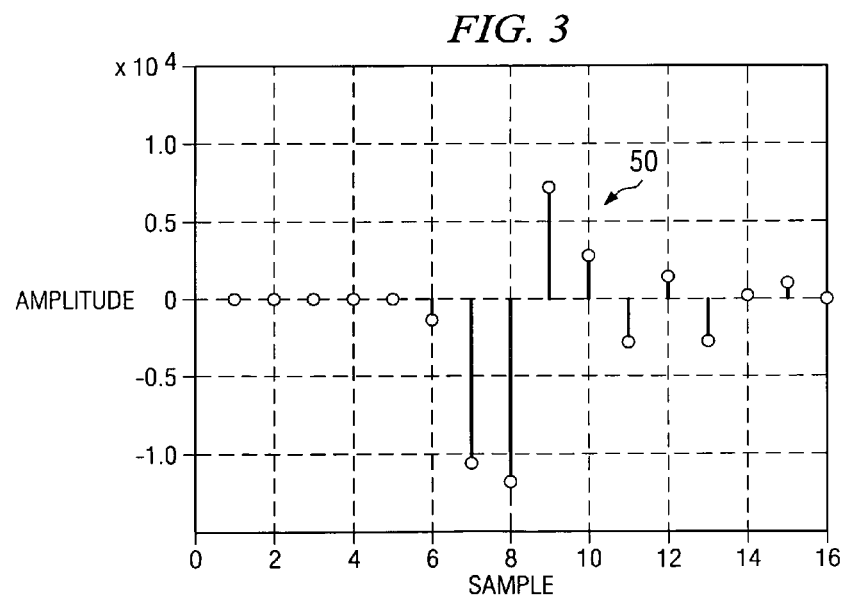
FIG. 3 illustrates a graph of amplitude versus sample counts of a real portion of a fixed wireless channel response.
Figure 4:
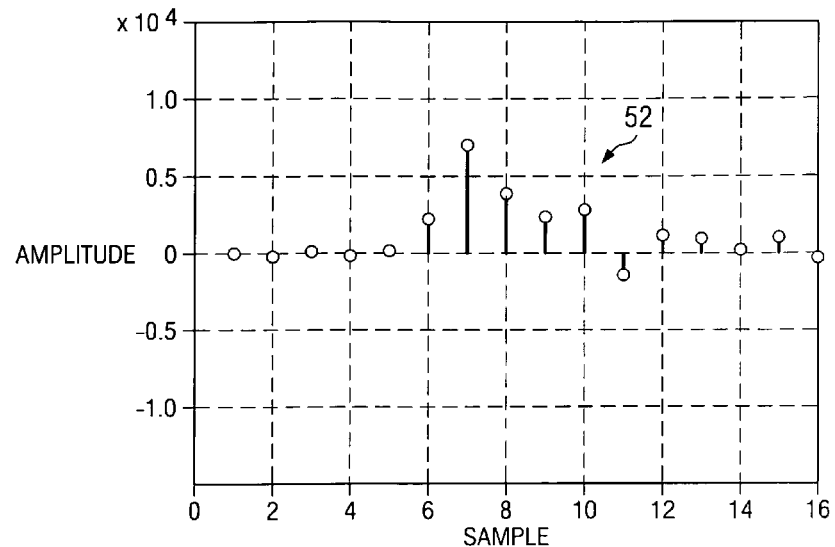
FIG. 4 illustrates a graph of amplitude versus sample counts of an imaginary portion of the fixed wireless channel response corresponding to the real portion of FIG. 3.

For example, FIG. 3 illustrates a graph of amplitude versus sample counts of a real portion 50 of a fixed wireless channel response and FIG. 4 illustrates a graph of amplitude versus sample counts of an imaginary portion 52 of the fixed wireless channel response. This channel response model has 16 taps or terms, with seven of them near zero. To determine a channel model for this system in the frequency domain, the FFT of the channel response must be computed. After analyzing the channel response data, Q=14 and P=3, which suggests that only 2 bits of growth will ever occur in the FFT. Since the channel response data can be represented with 15 bits, only 17 bits will be required to present the FFT data. Since it is desirable to store the data in 16 bit registers, one right shift is necessary when computing the FFT.

Figure 5:
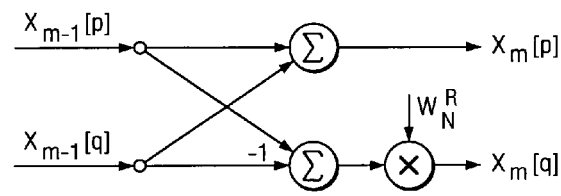
FIG. 5 illustrates a representation of a radix-2 stage in accordance with one aspect of the present invention.

The Discrete Fourier Transform (DFT) is one way to convert the signal from time domain to frequency domain. The DFT is a discrete version of the FFT and is readily computable by a microprocessor. There are $N^2$ complex multiplications and $N*(N-1)$ complex additions for a N-point DFT. One of the algorithms that dramatically reduce the number of computations is the radix-2 FFT, which takes advantage of the periodicity of twiddle factor multipliers. FIG. 5 illustrates a simple two-point radix-2 stage or butterfly. The two-point radix-2 stage divides a Discrete Fourier Transform (DFT) into two smaller DFTs. The two-point radix-2 stage consists of two complex additions for the input data and one complex multiplication with a twiddle factor. A N-point FFT consists of $Log_2(N)$ stages and each stage consists of N/2 butterflies.

Figure 6:
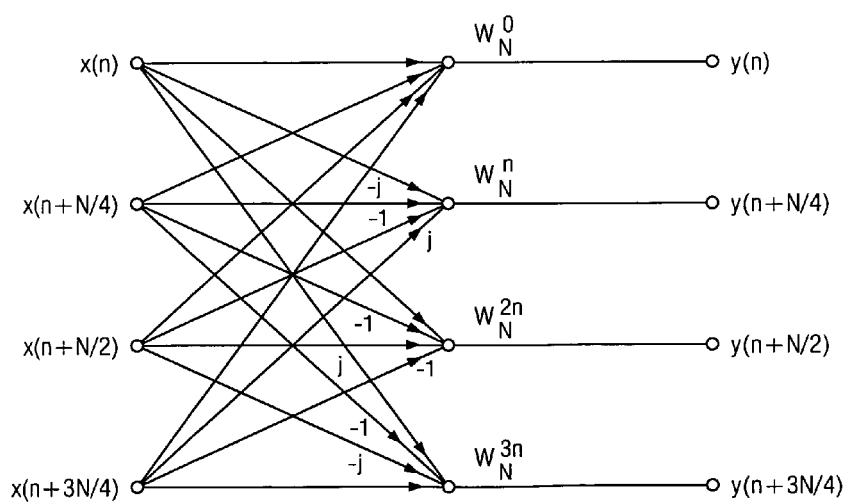
FIG. 6 illustrates a representation of a radix-4 stage in accordance with one aspect of the present invention.

FIG. 6 illustrates a representation of a simple radix-4 stage where n=0, 1, . . . , N/4−1. The radix-4 stage is even more computationally efficient than the radix-2 FFT. The radix-4 FFT essentially combines two stages of a radix-2 FFT into one, so that half as many stages are required. Since the radix-4 FFT requires fewer stages and fewer butterflies than the radix-2, the computation of the FFT is further improved. For example to calculate a 16-point FFT, the radix-2 takes $log_2(16)$ or 4 stages, while the radix-4 takes only $log_4(16)$ or 2 stages. When using a fixed-point DSP to perform FFT calculations, summation overflow problems need to be addressed for each of the stages. Conventionally, scaling is provided at each stage of a FFT computation to compensate for bit growth at each stage associated with limited register size. The present invention addresses these overflow issues by analyzing an input signal to a FFT and determining at which stages bit growth is present and/or absent and provides the appropriate scaling, such that scaling is omitted at stages where bit growth is absent.

The following examples will be illustrated with respect to employing radix-2 and/or radix-4 stages to compute a N-point FFT. However, the present invention is applicable to one or more radix-M stages where M is an integer greater than zero.

Figure 7:
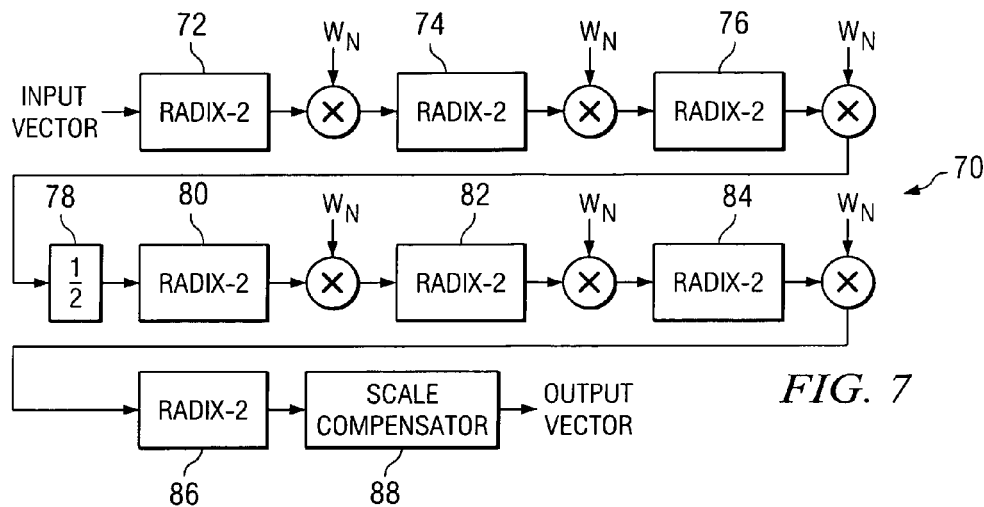
FIG. 7 illustrates a block schematic diagram of a 128-point scale reduced FFT in accordance with one aspect of the present invention.

FIG. 7 illustrates a particular example of a 128-point FFT 70 for transforming a channel response similar to the channel response illustrated in FIGS. 3 and 4. The 128-point FFT 70 includes seven radix-2 FFT stages with a single scale factor 78. In contrast, a conventional 128-point FFT would require a scale factor before each radix-2 FFT stage. A 128-point input vector is fed into a first radix-2 stage 72, multiplied by a twiddle factor $W_N$, then fed to a second radix-2 stage 74, which is multiplied by a twiddle factor $W_N$, and then fed to a third radix-2 stage 76. If the input is zero padded, a scale factor does not precede the first radix-2 stage 72. After the third radix-2 stage 76, the input vector is multiplied by a twiddle factor $W_N$ followed by multiplication of a scale factor 78 of ½. The ½ scale factor 78 compensates for a possible addition overflow in a fourth radix-2 stage 80.

The resultant vector then is fed to the fourth radix-2 stage 80, a fifth radix-2 stage 82, a sixth radix-2 stage 84 and a seventh radix-2 stage 86. Each stage is followed by a corresponding twiddle factor multiplication $W_N$ with no scaling associated with stages 82, 84 and 86 because bit growth is absent from such stages. The 128-point input vector is fed into a scale compensator 88 to compensate for the scale factor 78 and to provide the desired output scaling. For example, if 1/16 scaling is desired, the scale compensator multiplies the input vector by ⅛ to provide an output scaled by 1/16 (½*⅛=1/16). To achieve a 1/16 scaling with a conventional 128-point FFT, the scale compensator would be 8 to compensate for scaling before every stage (½⁷* $2^3$=½⁴ or 1/16). The scale compensator 88 then provides a FFT output vector. The reduced scale FFT of FIG. 7 provides a SNR improvement of 25 to 40 dB (decibels), depending on the data burst configuration, from the FFT input to the FFT output compared to a conventional FFT scaled at every stage.

Figure 8:
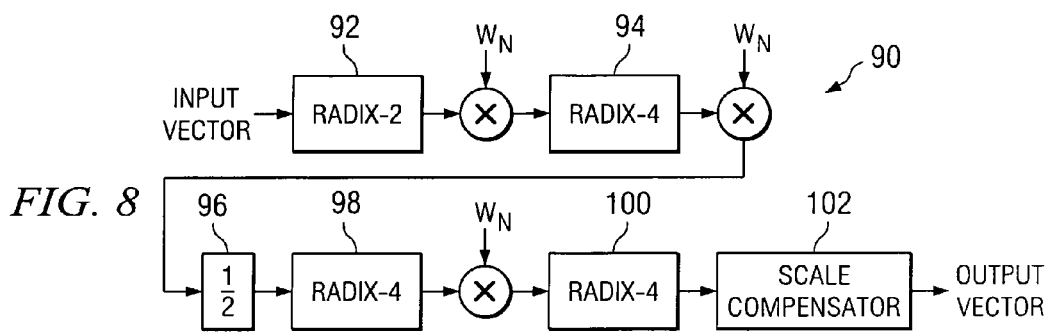
FIG. 8 illustrates a block schematic diagram of a 128-point scale reduced FFT with a radix-2 stage and radix-4 stages in accordance with one aspect of the present invention.

FIG. 8 illustrates a block diagram of an improved FFT configuration 90 of FIG. 7 after several Radix-2 stages have been combined into Radix-4 stages to further reduce cycle counts. A 128-point input vector is fed into a first radix-2 stage 92 multiplied by a twiddle factor $W_N$ then fed to a first radix-4 stage 94. If the input is zero padded, a scale factor does not precede the first radix-2 stage 92. After the first radix-4 stage 94, the input vector is multiplied by a twiddle factor $W_N$ followed by multiplication of a scale factor 96 of ½. The ½ scale factor compensates for a possible addition overflow in a second radix-4 stage 98. The resultant vector then is fed to the second radix-2 stage 98 followed by a twiddle factor multiplication $W_N$ and a third radix-4 stage 100. The first radix-4 stage 94 and the third radix-4 stage 100 do not require scaling due to the nature or characteristics of the input vector. The 128-point vector is fed into a scale compensator 102 to compensate for the scale factor 96 and to provide the desired output scaling.

It is to be appreciated that the reduced scale 128-point FFT of FIGS. 7–8 are for illustrative purposes. The scale reduced FFT of the present invention can be applied to various types of input signals utilizing a variety of fixed-point processors. A reduced scaled FFT can be determined by performing a first summation of all input magnitudes for N points of the input signal to determine the total number of bits that the output signal grows. A N-point FFT can be performed on the input signal to determine at which stages of the FFT that bit growth is present and/or absent. Multiplications can be eliminated from the N-point FFT to reduce the number of computations. If bit growth is present the results of the summation of the N points is scaled by a scale factor, so that summation overflow does not occur. The summation and bit growth determination is made at each stage. The scale factors can then be aggregated and compared to the first summation to verify that the appropriate scaling was determined.

Figure 9:
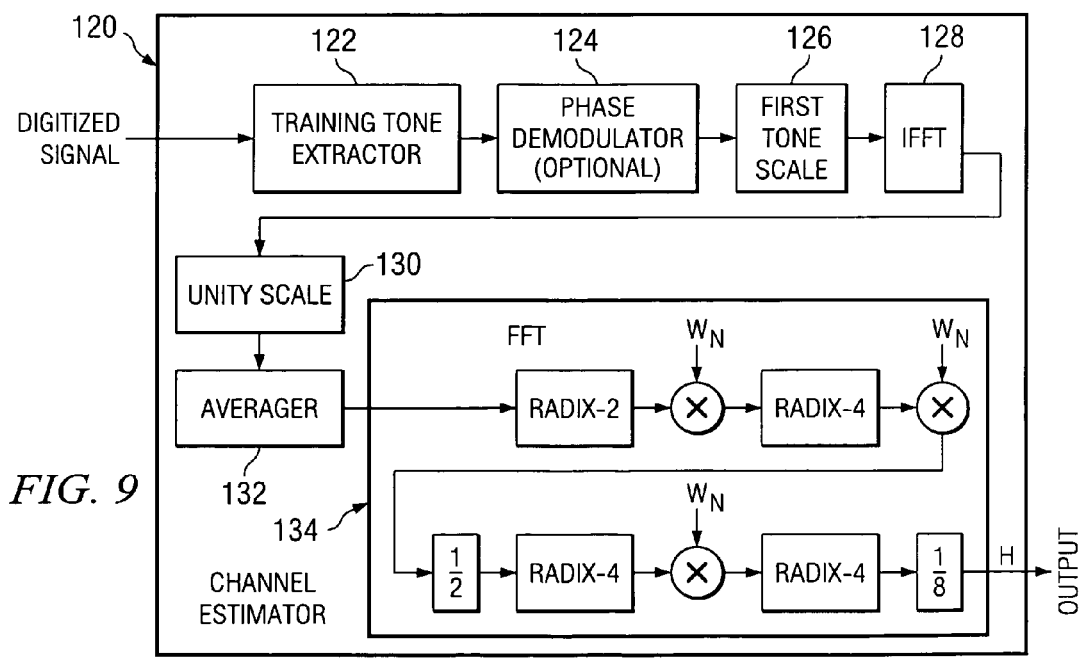
FIG. 9 illustrates a functional block diagram of a channel estimator employing a scale reduced FFT in accordance with one aspect of the present invention.

FIG. 9 illustrates a schematic block diagram of a channel estimator 120 employing a scale reduced FFT in accordance with one aspect of the present invention. The channel estimator 120 receives a digitized signal or burst (e.g., conforming to OFDM), after the burst has been amplified, filtered, digitized, decimated and converted into the frequency domain by applying a FFT algorithm. The resultant digitized format consists of a plurality of zero tones, and a plurality of training tones dispersed amongst a plurality of data tones. The channel estimator 120 includes a training tone extractor 122, which extracts the training tones from the data burst. An optional phase demodulator 124 is provided. The extracted training tones are sometimes modulated with QPSK data. If this is the case, the phase demodulator 124 removes the phase modulation from the extracted training tones.

The first tone of the training tones (i.e., the edge tone) can be transmitted with reduced magnitude. The first tone scale 126 scales the first tone by the inverse of the reduction factor to restore its magnitude to that of the other training tones. An IFFT component 128 is then performed on the training tones to obtain time samples of the channel impulse response. The training tones are initially transmitted with magnitudes larger than the unity for signal to noise reasons. The impulse response is then globally rescaled by a unity scale 130 to adjust the channel magnitude to reflect unity training tones. The now rescaled channel response is averaged with previous channel responses by an averager 132 which can be, for example, a single pole filter. The average impulse response has a finite number of terms and is provided to a scale reduced FFT component 134. The scale reduced FFT component 134 performs a 128-point FFT on the impulse response.

The scaled reduced FFT component 134 performs a scale reduced FFT of 128-points on the impulse response to provide a channel estimate value for the data burst. The scale reduced FFT component 134 is comprised of a first radix-2 stage followed by three radix-4 stages. A ½ scale factor is provided between a first radix-4 stage and a second radix-4 stage. A third radix-4 stage follows the second radix-4 stage. A ⅛ compensator follows the third radix-4 stage to provide a 1/16 scaled output. The scaled output is the channel estimate (H) utilized to adjust data tones for channel magnitude loss and phase offsets due to multipath propagation.

It is to be appreciated that various configurations of the scale reduced FFT component 134 can be employed based on the number of FFT points, the format of the channel impulse response and the number of bits in the fixed-point processor if a fixed-point processor is being utilized. The channel estimation procedure of the present invention is especially useful in applications where the receiver is located in a fixed position. In this situation, the channel only changes at a rate of about 1–2 hertz or about every second and the channel impulse response has a finite number of nonzero terms, so scaling can be reduced at stages where bit growth does not occur.

In view of the foregoing structural and functional features described above, a methodology in accordance with various aspects of the present invention will be better appreciated with reference to FIGS. 10–11. While, for purposes of simplicity of explanation, the methodologies of FIGS. 10–11 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 10 illustrates one particular methodology for performing a scale reduced FFT on a received input signal in accordance with one aspect of the present invention. An input signal is received by a receiver at 200. The input signal is filtered and digitizes at 210. At 220, the filtered and digitized input signal is analyzed to determine a first summation of all the input magnitudes for N points of the input signal. The input signal can be analyzed by modeling and simulation either off-line or in real-time. At 230, a determination is made of the total number of bits that the output can grow based on the summation. At 240, an input magnitude summation on the input signal is performed at each stage of a N-point FFT to determine stages at which bit growth is present and/or absent. The N-point FFT operation includes summation of the input values to each stage and determining if bit growth can occur. If bit growth can occur in a particular stage, the input values to that stage are scaled by a scale factor, so that summation overflow does not occur. The summation and bit growth determination is made at each stage. Multiplications can be omitted to reduce the number of computations in the N-point FFT. At 250, the scale factors are aggregated and compared to the summation of all the input magnitudes to verify that the appropriate scaling was determined.

For example, for an input signal with terms that are substantially (e.g., zero or very near zero), bit growth can be omitted at certain stages while multiplication of ½ can be utilized to compensate for bit growth at stages where bit growth does occur. For a 128-point FFT with seven subsequent Radix-2 stages, scaling can be provided between the third and fourth Radix-2 stages but omitted at the other stages, such that a FFT computation reduction is the result. At 260, an output scaling value is determined for compensating for bit growth scaling in addition to providing a desired scaled output. At 270, the bit growth scaling values and the output scaling values are then stored in memory to apply to subsequent input signals.

FIG. 11 illustrates one particular methodology for performing a channel estimation procedure utilizing a scale reduced FFT in accordance with one particular aspect of the present invention. The methodology begins at 300 where a receiver receives a data burst and extracts training tones from the data burst. The input to the channel estimation procedure is the complete set of frequency samples (tones) obtained from an initial FFT performed by the receiver. The initial FFT can be a scale reduced FFT. The training tones are extracted from the full set of tones. The training tones were transmitted with magnitude and phase known a priori, and are used for the channel estimation. The training tones are sometimes modulated with QPSK data. The first tone of the training tones (i.e., the edge tone) is sometimes transmitted with reduced magnitude using a reduction factor. At 310, the modulation is removed and the edge training tone is scaled if applicable. The edge training tone is scaled by the inverse of the reduction factor to restore its magnitude to that of the other training tones.

At 320, an IFFT is performed on the training tones to obtain time samples of the channel impulse response. The methodology then proceeds to 330. The training tones were initially transmitted with magnitudes larger than the unity for signal to noise reasons. At 330, the impulse response is now globally rescaled (all samples are rescaled by the same factor) to adjust the channel magnitude to reflect unity-training tones. At 340, the now rescaled channel response is averaged with the previous channel responses (e.g., with a simple single pole filter). The method then proceeds to 350 where the average impulse response is zero padded to provide the appropriate number of points to perform a N-point FFT on the impulse response. For example, if there are 32 training tones and a 128-point FFT is being performed on the impulse response, 96 zeroes are added to the 32 training tones to provide 128 points to the 128-point FFT. If 16 bits are used to represent the data, the data should first be scaled by ½ so that the output of the first FFT stage can be represented by a 16-bit value. However, since the FFT is zero padded, a scale factor does not precede the first stage of the FFT.

At 360, a N-point FFT is performed on the zero padded impulse response to obtain a frequency domain channel estimate for the data burst. The N-point FFT includes scaling at stages where bit growth is present with scaling omitted at stages where bit growth is absent. Determination of whether or not scaling is to be provided at particular stages can be determined off-line or in real-time. At 370, the output is scaled to compensate for the bit growth scaling and to provide a desired scaled output. For example, if the desired scaled output is to be $1/16$ and bit growth only occurs at one stage of the FFT, providing a single ½ scale factor, the output scaled compensator can multiply the output by $1/8$ to obtain $1/16$ scaling. The channel estimate can then be provided for subsequent processing. The methodology of FIG. 11 can be performed on each data burst received.

What has been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A signal processing system comprising:
   a scale reduced Fast Fourier Transform component configured to transform an input signal from the time domain to the frequency domain; and
   a signal analyzer configured to
      perform a first summation of input magnitudes for N points of the input signal to determine a total number of bits that an output signal grows,
      perform a second summation of input magnitudes on at least one stage of a N-point Fast Fourier Transform to determine which of a plurality of processing stages of the scale reduced Fast Fourier Transform component experience bit growth, and
      compare the first summation with the second summation to verify appropriate scaling has been determined.

2. The system of claim 1, the plurality of processing stages being a plurality of complex additions and complex multiplications.

3. The system of claim 2, the plurality of processing stages comprising at least one radix-M stage where M is an integer greater than zero.

4. The system of claim 2, the plurality of processing stages comprising at least one of a radix-2 stage and a radix-4 stage.

5. The system of claim 2, the plurality of processing stages comprising an output scaling stage to compensate for scaling of stages due to bit growth at the corresponding stage and to provide a desired scaled output.

6. The system of claim 1, wherein the signal analyzer is further configured to analyze the characteristics of the input signal and determine which of a plurality of processing stages experience bit growth, the signal analyzer providing scaling at the processing stages that experience bit growth, such scaling being omitted at stages where bit growth is absent due to the characteristics of the input signal.

7. The system of claim 1, the scale reduced Fast Fourier Transform component residing in a channel estimator and providing a channel estimate derived from a channel impulse response.

8. A channel estimator comprising:
   a training tone extractor operative to extract training tones from a digitized data signal;
   an Inverse Fast Fourier Transform component that determines a channel impulse response based on the extracted training tones;
   a Fast Fourier Transform component that transforms the channel impulse response into a channel estimate, the Fast Fourier Transform component having a plurality of processing stages with scaling provided at stages to compensate for bit growth, such scaling being omitted at stages where bit growth is absent due to the characteristics associated with the channel impulse response; and
   a signal analyzer configured to
      perform a first summation of input magnitudes for N points of the input signal to determine a total number of bits that an output signal grows,
      perform a second summation of input magnitudes on at least one stage of a N-point Fast Fourier Transform to determine which of the plurality of processing stages of the scale reduced Fast Fourier Transform component experience bit growth, and
      compare the first summation with the second summation to verify appropriate scaling has been determined.

9. The channel estimator of claim 8, the Fast Fourier Transform component performing a N-point Fast Fourier Transform on the channel impulse response and the plurality of processing stages being $Log_2(N)$ number of radix-2 stages.

10. The channel estimator of claim 9, N being 128 and $Log_2(N)$ number of radix-2 stages being 7.

11. The channel estimator of claim 10, the channel impulse response having amplitude values that are substantially zero where scaling is provided to compensate for bit growth between the third stage and fourth stages and omitted at other stages.

12. The channel estimator of claim 10, the second and third radix-2 stages, the fourth and fifth radix-2 stages and the sixth and seventh radix-2 stages comprising a first, a second and a third radix-4 stage, respectively.

13. The channel estimator of claim 8, the data signal being transmitted in a multicarrier modulation format.

14. The channel estimator of claim 8, at least a portion of the channel estimator residing on a digital signal processor.

15. A modem for communicating over a transmission channel, the modem comprising:

a front end portion operable to receive data encoded in time domain data signals having a generally consistent format; and a digital signal processor coupled to the front end portion, the digital signal processor being programmed to perform a N-point Fast Fourier Transform on the time domain data signals to convert the time domain data signals into frequency domain data signals, the N-point Fast Fourier Transform having a plurality of processing stages with scaling provided at stages where bit growth is present and scaling being omitted from stages where bit growth is absent, the stages with and without bit growth being determined by analyzing the general consistent format of the time domain data signals, wherein the digital signal processor is further configured to perform a first summation of input magnitudes for N points of the input signal to determine a total number of bits that an output signal grows, perform a second summation of input magnitudes on at least one stage of a N-point Fast Fourier Transform to determine which of the plurality of processing stages of the scale reduced Fast Fourier Transform component experience bit growth, and compare the first summation with the second summation to verify appropriate scaling has been determined.

16. The modem of claim 15, the analyzing of the general consistent format being performed by modeling and simulation prior to programming of the digital signal processor.

17. The modem of claim 15, the analyzing of the general consistent format being performed by a signal analyzer routine that determines scaling in real-time and stores the scaling in memory for subsequent time domain data signals.

18. The modem of claim 15, data signal being transmitted in a multicarrier modulation format and the modem being a wireless modem.

19. A receiver system, comprising:

means for receiving at least one digitized signal in the time domain;

means for performing a N-point Fast Fourier Transform on the at least one digitized signal to convert the at least one digitized signal to the frequency domain, the N-point Fast Fourier Transform having scaling associated with those of a plurality of processing stages where bit growth is present and having no scaling at stages where bit growth is absent; and means for performing a first summation of input magnitudes for N points of the input signal to determine a total number of bits that an output signal grows, performing a second summation of input magnitudes on at least one stage of the means for performing the N-point Fast Fourier Transform to determine which of the plurality of processing stages experience bit growth, and comparing the first summation with the second summation to verify appropriate scaling has been determined.

20. The system of claim 19, further comprising means for determining stages at which scaling is to be provided and omitted.

21. A method of reducing scaling in at least one Fast Fourier Transform computation being performed on signals in a wireless communication system, the method comprising:

analyzing a digitized data signal to determine Fast Fourier Transform input magnitudes for N points of the digitized signal;

summing the digitized signal input magnitudes for the N points to provide a total magnitude summation;

performing an input magnitude summation on at least one stage of a Fast Fourier Transform to determine stages at which bit growth is present and absent;

providing scaling at stages where bit growth is present; and comparing the scaling at stages where bit growth is present with the total magnitude summation to verify that the appropriate scaling has been provided.

22. The method of claim 21, further comprising storing scaling values for performing a scale reduced Fast Fourier Transform on subsequent digitized data signals.

23. A method for performing a channel estimation procedure comprising:

extracting training tones from a digitized data burst;

determining a channel impulse response based on the extracted training tones;

performing a scale reduced Fast Fourier Transform on the channel impulse response to provide a channel estimate indicative of the effects of a channel on the digitized data burst;

determining a first summation of the magnitudes of the total number of bits that a N-point Fast Fourier Transform output grows;

performing an input magnitude summation on at least one stage of the N-point Fast Fourier Transform to determine which of a plurality of processing stages experience bit growth; and comparing the first summation with the input magnitude summation to verify appropriate scaling has been determined.

24. The method of claim 23, the scale reduced Fast Fourier Transform component having a plurality of processing stages with scaling associated with stages to compensate for bit growth, such scaling being omitted at stages where bit growth is absent due to characteristics associated with the channel impulse response.

25. The method of claim 23, the data burst being transmitted in a multicarrier modulation format and the channel impulse response having a finite duration impulse response.

26. The method of claim 23, further comprising analyzing the data burst and determining which of the plurality of stages experiences bit growth and providing scaling at the stages that experience bit growth.

* * * * *